Patented June 19, 1945

2,378,575

UNITED STATES PATENT OFFICE 2,378,575

RESINOUS COMPOSITION

Arthur Jere Norton, Wells, Maine, assignor to Monsanto Chemical Company, St. Louis, Mo., a corporation of Delaware No Drawing. Application February 19, 1941,
Serial No. 379,587

2 Claims. (Cl. 260—44)

This invention relates to improved compositions of matter and more particularly, to the use of these composiitons as binding agents in friction elements.

This invention has for an object the preparation of improved resinous compositions. Another object of this invention is to prepare improved binding agents for friction elements. A more particular object is to prepare an improved oxidation-resisting binding agent for such friction elements as brake linings, clutch facings and the like.

According to the present invention, it has been found that improved compositions of matter are obtained by initially reacting together in varying proportions, as hereinafter illustrated, a phenol, a primary amine and an aldehyde to form a resin, and then adding thereto an alkyd resin.

In the preferred embodiment of this invention, said phenol, said primary amine and said aldehyde are reacted together to give a heat-reactive resin, which resin is then combined with an alkyd resin to give an ultimate resinous mixture that is heat-reactive. By a heat-reactive resin is meant a resin that increases in viscosity by the application of heat and which, preferably, eventually becomes infusible by the continued application of heat.

When the new compositions of this invention are to be employed for example, as binding agents for friction elements, it is preferred that the alkyd resin be an oxidation-resisting alkyd resin.

Illustrative, but not limitative thereof, are alkyd resins obtained by reacting such polyhydric alcohols as glycerin, ethylene glycol and the like with such polybasic acids, or the anhydrides thereof, as ortho-phthalic acid, succinic acid, adipic acid, sebacic acid and the like, the product of the reaction between glycerin and phthalic anhydride being the particularly preferred alkyd resin.

The following examples illustrate the preparation of the new compositions of this invention, but are not to be construed as limitative thereof. The parts are by weight in these examples.

Example 1

A mixture of 100 parts of phenol and 100 parts of aniline was heated to substantially 100° C. in a suitable vessel equipped with a reflux condenser. Thereafter, substantially 190 parts of a 37% solution of formaldehyde were added and the resulting mixture heated for substantially 2 hours at substantially 100° C. The reaction vessel was then opened to the atmosphere and the product was dehydrated by heating in the open vessel until the temperature of the mixture reached substantially 130° C. The resinous material so produced was brittle and had a softening point of substantially 73° C.

A solution was then prepared by mixing together 20 parts of the foregoing resin, 49.2 parts of benzol and 30.8 parts of a solution of a heat-reactive oxidation-resisting alkyd resin containing substantially 65% solids. (The foregoing alkyd resin solution was a commercial material marketed under the designation "Glyptal #2477" and is a solution of castor oil modified glyceryl phthalate resin.) The resulting solution had a solids content of substantially 40% by weight and contained substantially equal parts of the two types of resins.

Example 2

100 parts of phenol, 50 parts of aniline and 50 parts of a commercial 37% solution of formaldehyde were reacted together in the same manner as in the preparation of the product of Example 1. After the reaction product had been dehydrated as in Example 1, 100 parts of the resin so produced were mixed with 154 parts of the same type of alkyd resin solution as was employed in Example 1 and 79 parts of benzol. The resulting solution had a solids content of substantially 60% and comprised substantially equal parts of the two types of resin.

The products of the foregoing examples have been found to be highly advantageous, for example, as binding agents for friction elements. The incorporation of these compositions with the base materials of friction elements as, for example, such a frictional filler as asbestos tape, may be accomplished by impregnating the base materials with the solutions prepared as in Examples 1 and 2. Thereafter, the solvent may be removed by the application of heat, the impregnated product formed to the shape desired and then subjected to the further application of heat. In the past, the resinous materials used for this purpose have frequently comprised phenol-formaldehyde resins modified with such materials as tung oil or linseed oil. Such resinous compositions have possessed the disadvantage that they are subject to relatively rapid deterioration which is believed to be the result of oxidation. Other prior resinous binding agents, as for example, the alkyd resins per se and alkyd resins modified with drying oils, have tended to be non-uniform in wearing qualities. In contrast with such prior products, brake bands employing as binding agents the products of Examples 1 and 2, have been found to be far superior to these prior products. These improved brake bands have been found to be not only highly resistant to the type of deterioration that is believed to be the result of oxidation, but also have been found to possess remarkably uniform wearing qualities and high heat resistance, strength and frictional value.

The resin components of the products of this invention may be mixed and the resulting material employed in forms other than in solution. Thus, one other method is to mechanically mix the two components by means of suitable apparatus, as for example, by means of mixing rolls or a Banbury mixer. The resulting mixture, after suitable comminution, may then be molded under heat and pressure with, or without, the prior incorporation of a suitable filler, as for example, a frictional filler. A still further method comprises sufficiently shortening the extent of the reaction of one or both of the resin components so that a liquid or easily liquifiable mixture of the two components can be prepared and this mixture employed for coating and/or impregnating purposes. In the case of impregnated products, such materials, after impregnation, can then be dried, if necessary, and finally heat-reacted, with or without the application of pressure.

The ratios of phenol-amine-aldehyde resin to alkyd resin in the new compositions of this invention may be widely varied. However, particularly in preparing compositions for use as binding agents for friction elements, it is preferred to employ compositions in which the amount of neither component present in the mixture exceeds substantially 66% by weight of the total amount of the two components. In preparing friction elements, the proportion of binder to base material may be varied to fit any particular requirements. Such factors as the concentration of the resin solution (if a solution be employed to impregnate the base material), the particular method by which the resins are made, the ratios of phenol-amine-aldehyde resin to alkyd resin and the extent to which the resins are reacted tend to govern the concentration of binder in the finished friction material.

It is obvious that the method and the ratios of reactants employed in preparing the resins and, particularly, the phenol-amine-aldehyde resin, may be widely varied. Thus, referring to Examples 1 and 2, the phenol, formaldehyde and aniline can be mixed at room temperature and heated together to the reaction temperature. Furthermore, as stated above, the relative proportions of phenol, formaldehyde and aniline may be widely varied. Thus, it is preferred, in preparing a resin for certain purposes, with enhanced heat-reactive properties, to react a mixture comprising slightly more than two mols of formaldehyde to two mols of the mixed phenol-aniline component. However, the proportion of formaldehyde may be increased to substantially four mols when advantageous, or may even be decreased to substantially one mol in the foregoing reaction mixture.

Although phenol, aniline and formaldehyde are the preferred components of the phenol-amine-aldehyde resin, other phenols, such as ortho, meta or para cresols, other primary amines, such as toluidine, aminodiphenyl, etc., and other aldehydes, such as acetaldehyde, are employable in preparing this type of resin. Suitable catalysts may be employed in preparing the resins and plasticizers, or other modifying materials added, if desired, to either or both types of resins.

While asbestos tape has been given as an example of a suitable frictional filler to be employed as the base material of the friction elements of this invention, other fillers may be employed, as is obvious to those skilled in the art.

This invention is limited solely by the claims attached hereto.

What is claimed is:

1. A friction element, the binding agent of which comprises a heat reacted mixture of a fusible, potentially reactive, oxidation resisting, castor oil modified glycerol phthalate resin and a fusible resin prepared by heating a mixture of 100 parts of phenol, 50–100 parts of aniline and formaldehyde, the proportions of the two resins being such that the weight of neither resin exceeds substantially two-thirds of the sum of the weights of the two resins.

2. A friction element, the binding agent of which comprises a heat reacted mixture of a fusible, potentially reactive, oxidation resisting, castor oil modified glycerol phthalate resin and a fusible resin prepared by heating 100 parts of phenol, 50–100 parts of aniline and an amount of formaldehyde in molar excess of the sum of the mols of phenol and aniline, the proportions of the two resins being such that the weight of neither resin exceeds substantially two-thirds of the sum of the weights of the two resins and said binding agent having been rendered substantially infusible by the application of heat.

ARTHUR JERE NORTON.